US 6,738,070 B2

(12) United States Patent
Brokenshire et al.

(10) Patent No.: US 6,738,070 B2
(45) Date of Patent: May 18, 2004

(54) METHOD AND APPARATUS FOR RECTANGULAR MIPMAPPING

(75) Inventors: Daniel Alan Brokenshire, Round Rock, TX (US); David Arthur Dick, Austin, TX (US); Matthew Edward King, Pflugerville, TX (US); William B. Tiernan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 10/042,083

(22) Filed: Jan. 7, 2002

(65) Prior Publication Data

US 2003/0128217 A1 Jul. 10, 2003

(51) Int. Cl.⁷ .................................................. G09G 5/00
(52) U.S. Cl. ....................... 345/587; 345/588; 345/586; 345/581; 345/582
(58) Field of Search ................................ 345/587, 588, 345/586, 582, 581

(56) References Cited

U.S. PATENT DOCUMENTS

| 5,222,205 A | * | 6/1993 | Larson et al. ................ 345/587 |
| 5,490,240 A | * | 2/1996 | Foran et al. ................. 345/587 |
| 6,057,861 A | * | 5/2000 | Lee et al. .................... 345/569 |
| 6,154,216 A | * | 11/2000 | Walton ........................ 345/619 |

* cited by examiner

Primary Examiner—Matthew C. Bella
Assistant Examiner—Manucher Rahmjoo
(74) Attorney, Agent, or Firm—Carr LLP; Robert M. Carwell

(57) ABSTRACT

A method and an apparatus for retrieving a mipmap from memory. The method and apparatus provide an efficient method of determining the location of the desired mipmap in memory by storing the address of each row of mipmaps and calculating the offset from the start of the row to the desired mipmap. The mipmap is retrieved from memory at the location corresponding to the sum of the start address and the offset.

9 Claims, 3 Drawing Sheets

METHOD AND APPARATUS FOR RECTANGULAR MIPMAPPING

BACKGROUND OF THE INVENTION

1. Field of the Invention

The invention relates generally to computer architectures and, more particularly, to a method and an apparatus for texturing a graphical image onto an object.

2. Description of Related Art

Computer graphics generally use texturing techniques to provide the illusion of movement relative to some object to provide special effects, such as textures, luminescence, transparency, lettering, and the like. Texturing is a process of applying a filter to an image, the filtered image then being applied to an object. The filter typically changes based on the desired level of detail given the relative angle, distance, position, surrounding objects, the environment, and the like.

Each pre-filtered image, commonly referred to as a mipmap, is generally stored in memory, the address of which is stored in a known location for easy access. As the number of mipmaps increase, however, so do the number of addresses that need to be stored. For example, for an 8×8 pixel base mipmap, a complete set of rectangular mipmaps consist of 16 mipmaps, and, therefore, 16 addresses. The increased number of addresses, however, require additional memory.

Therefore, there is a need for a method and a system to efficiently store and retrieve mipmaps.

SUMMARY

The present invention provides a method and an apparatus for retrieving a desired mipmap from memory. The address of the desired mipmap is determined by summing an offset substantially equivalent to the amount of memory allocated to intervening mipmaps to a base address of the row of mipmaps.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the process of applying a mipmap to an image, the determination of which mipmap is to be used, and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
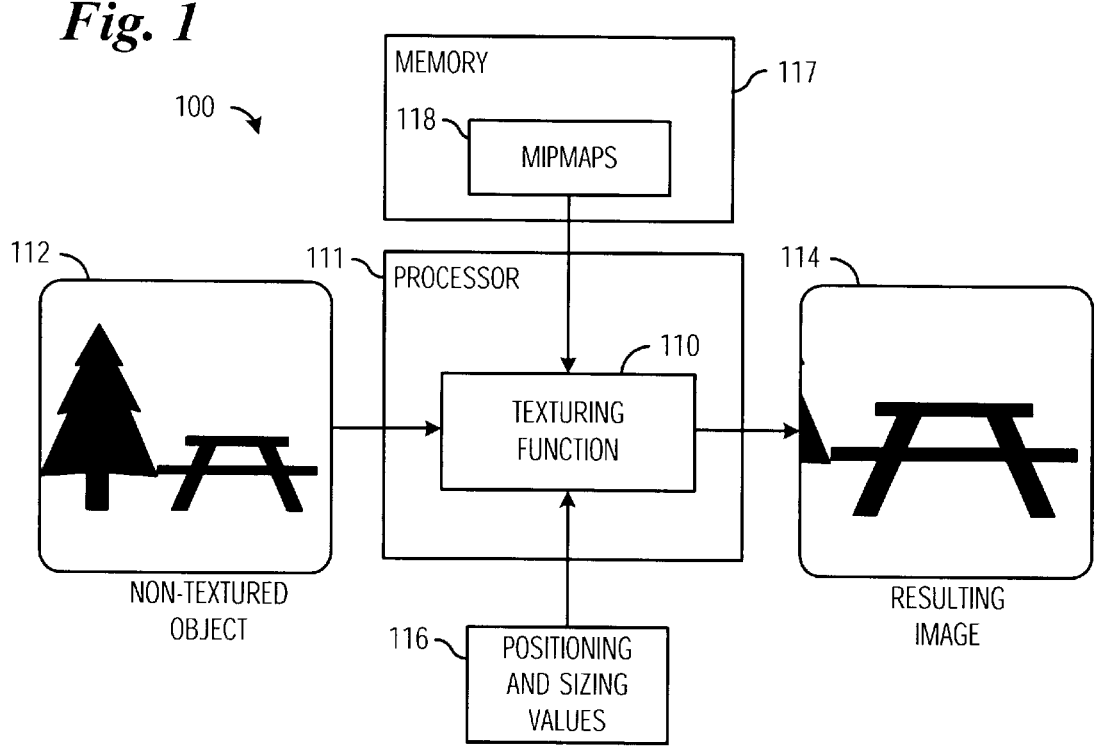
FIG. 1 is a schematic diagram of a typical texturing process.

Referring to FIG. 1 of the drawings, the reference numeral 100 generally designates a texturing system embodying features of the present invention. The texturing system 100 generally comprises a processor 111 configured to perform a texturing function 110. The texturing function 110 is configured to receive as input a non-textured object 112 and produce a resulting image 114. The texturing function 110 also preferably receives as input relative positioning and sizing values 116, such as locations, aspect angles, distances, and/or the like, and mipmaps 118, which are preferably stored in memory 117.

Generally, the texturing function 110 determines, based on the relative positioning and sizing values 116, which of the mipmaps 118 is to be applied to the non-textured object 112. The texturing function 110 applies the relevant mipmap to produce the resulting image 114.

Figure 2:
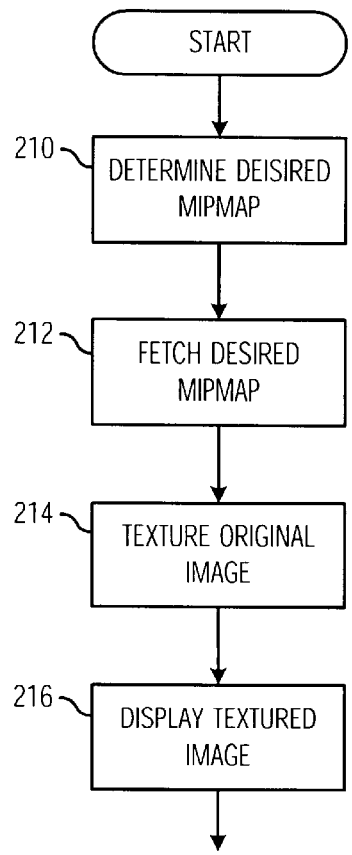
FIG. 2 is a data flow diagram illustrating one embodiment of the present invention in which a mipmap is applied to an image.

FIG. 2 is a flow chart depicting steps that may be performed by the texturing function 110 (FIG. 1) in accordance with one embodiment of the present invention that applies a mipmap to the non-textured object 112 to create the resulting image 114. Processing begins in step 210, wherein the desired mipmap is determined. Generally, the mipmaps are identified by a level-of-detail (LOD) coordinate, referred to as a ($LOD_U$, $LOD_V$) coordinate, and are determined in part upon the relative orientation to the object of the image. The process of determining the ($LOD_U$, $LOD_V$) coordinate is considered well known to a person of ordinary skill in the art, and, therefore, will not be discussed in greater detail herein except insofar as is necessary to adequately describe the present invention.

After, in step 210, the desired mipmap is determined, processing proceeds to step 212, wherein the desired mipmap is retrieved from memory, the process of which is described in further detail below with reference to FIGS. 3 and 4. Next, processing proceeds to steps 214 and 216, wherein the mipmap is applied to the non-textured object 112, producing the resulting image 114, and the resulting image 114 is displayed, respectively. The process of applying the mipmap to the non-textured object 112 and displaying the resulting image 114 is considered well known to a person of ordinary skill in the art and, therefore, will not be discussed in greater detail.

Figure 3:
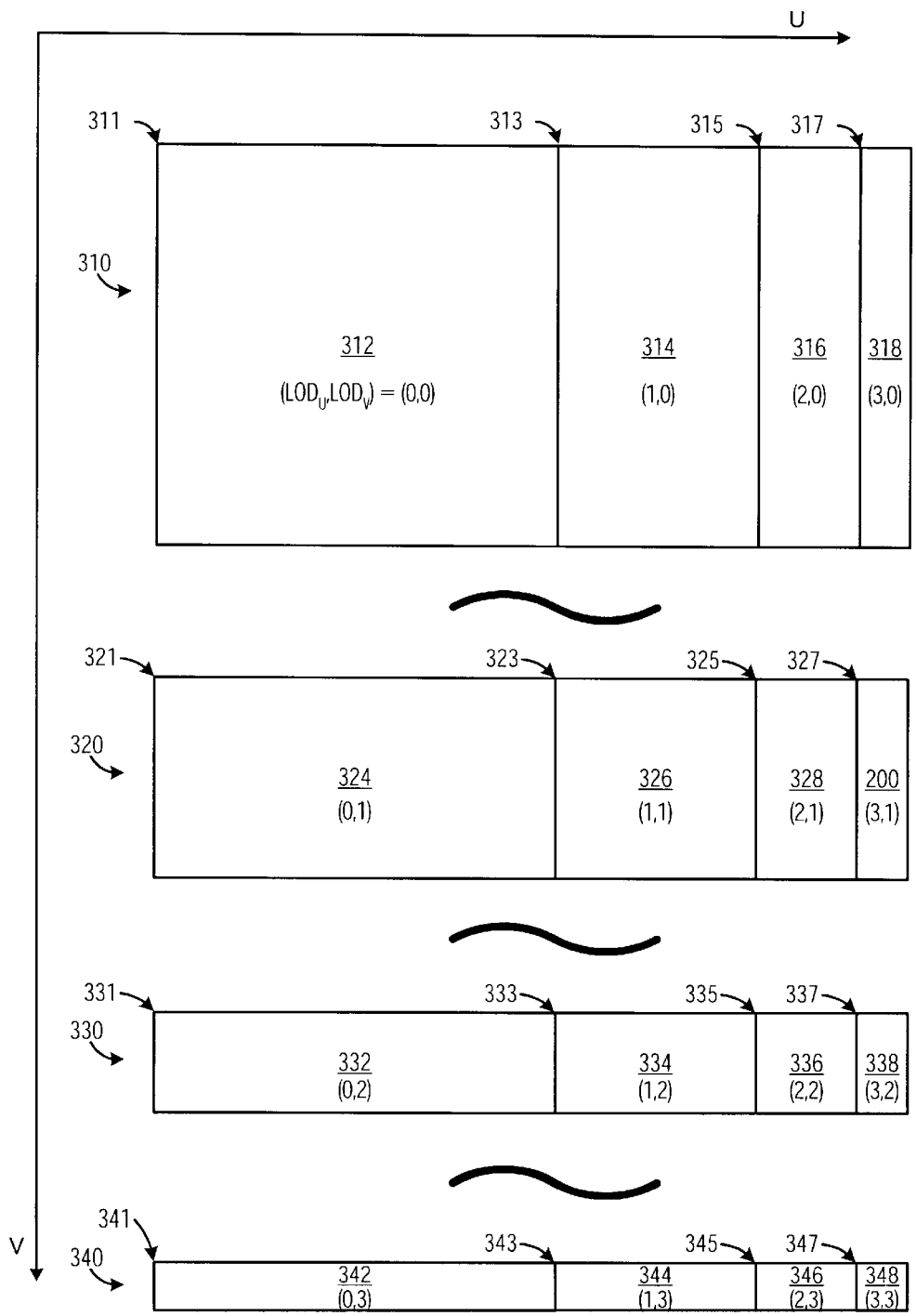
FIG. 3 is a diagram illustrating one embodiment of the present invention in which mipmaps are stored in memory.

FIG. 3 is a diagram depicting a memory map for a series of mipmaps for an 8×8 pixel base mipmap embodying features of one embodiment of the present invention. FIG. 3 and the following discussion refers to a structure of storing a series of mipmaps for a base mipmap size of 8×8 pixels. Other sizes, however, may be used, but is preferably a power of 2. The use of the present invention with other sizes is considered to be obvious to a person of ordinary skill in the art upon a reading of the present disclosure, and, therefore, will not be discussed in greater detail.

Reference numerals 310, 320, 330, and 340 designate blocks of memory. Block 310, which is located at memory location 311, comprises mipmaps 312, 314, 316, and 318 sequentially stored in memory, such that mipmap 312 begins at location 311, mipmap 314 begins at location 313, mipmap 316 begins at location 315, and mipmap 318 begins at location 317. Blocks 320, 330, and 340 are similarly constructed.

It should be noted, however, that blocks 310, 320, 330, and 340 are not necessarily stored sequentially in memory. As will be discussed in greater detail below, the beginning address of each block is stored in a known location in memory and, therefore, is independently addressable. As will be appreciated by one skilled in the art, however, if blocks 310, 320, 330, and 340 are sequentially stored, then the beginning addresses of 320, 330, and 340, i.e., addresses 321, 331, and 341, may be calculated given the address and size of the base mipmap, i.e., mipmap 312.

Conceptually, the mipmaps are organized into a table of mipmaps indexed by the ($LOD_U$, $LOD_V$) coordinate. Mipmap 312, preferably represented by the ($LOD_U$, $LOD_V$) coordinate of (0,0), represents the base mipmap. Mipmaps 314, 316, and 318 are sequentially reduced in size by a factor of 2 in the U direction. Similarly, each block 320, 330, and 340 are sequentially reduced by a factor of 2 in the V direction. The remaining mipmaps are sequentially reduced by a power of 2 in the respective direction, until the final mipmap, i.e., mipmap 348 represented by the LOD coordinate (3,3), which is a 1×1 mipmap, is reached. Specifically, if the base mipmap 312 is an 8×8 mipmap represented by the coordinate (0,0), mipmap 314 is a 4×8 mipmap represented by the coordinate (1,0), mipmap 316 is a 2×8 mipmap represented by the coordinate (2,0), mipmap 318 is a 1×8 mipmap represented by the coordinate (3,0), mipmap 322 is a 8×4 mipmap represented by the coordinate (1,0), mipmap 324 is a 4×4 mipmap represented by the coordinate (1,1), mipmap 326 is a 2×4 mipmap represented by the coordinate (1,2), mipmap 328 is a 1×4 mipmap represented by the coordinate (1,3), mipmap 332 is a 8×2 mipmap represented by the coordinate (2,0), mipmap 334 is a 4×2 mipmap represented by the coordinate (2,1), mipmap 336 is a 2×2 mipmap represented by the coordinate (2,2), mipmap 338 is a 2×2 mipmap represented by the coordinate (2,3), mipmap 342 is a 8×1 mipmap represented by the coordinate (3,0), mipmap 344 is a 4×1 mipmap represented by the coordinate (3,1), mipmap 346 is a 2×1 mipmap represented by the coordinate (3,2), and mipmap 348 is a 1×1 mipmap represented by the coordinate (3,3).

Figure 4:
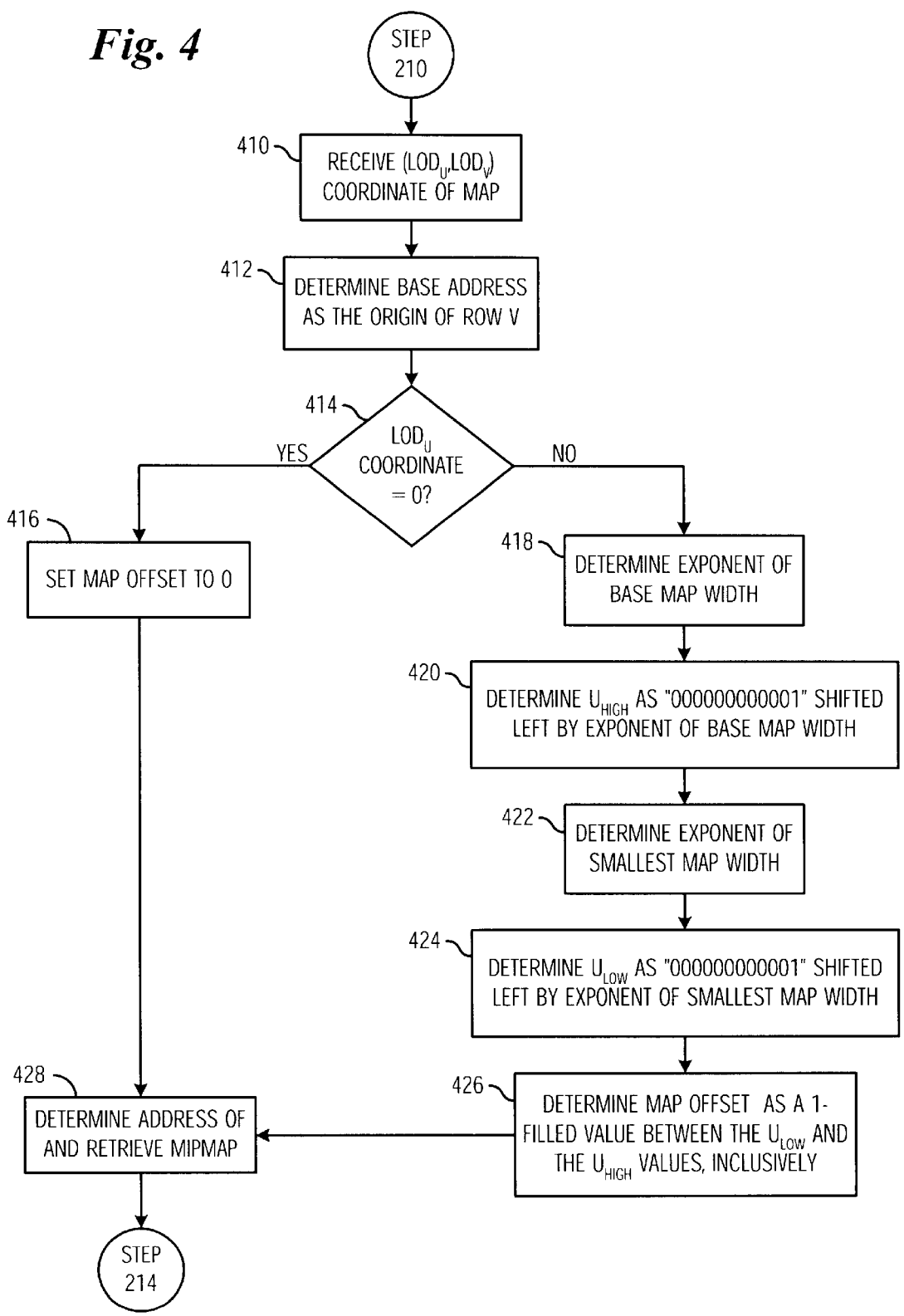
FIG. 4 is a data flow diagram illustrating one embodiment of the present invention in which a desired mipmap is retrieved from memory.

FIG. 4 is a flow chart depicting steps that may be performed in retrieving the desired mipmap, discussed above with respect to step 212 (FIG. 2), in accordance with a preferred embodiment of the present invention. Accordingly, after determining the ($LOD_U$, $LOD_V$) coordinate of the desired mipmap in step 210 (FIG. 2), processing proceeds to step 212 (FIG. 2), the details of which are depicted by FIG. 4.

Processing begins in step 410, wherein the ($LOD_U$, $LOD_V$) coordinate is received. Next, in step 412, the base address of the beginning of the mipmaps of corresponding to the row referenced by $LOD_V$ is determined. As discussed above, the beginning addresses of each row corresponding to $LOD_V$ is stored in a known location is memory. Alternatively, if the blocks 310, 320, 330, and 340 (FIG. 3) are stored sequentially, then the address of the row corresponding to $LOD_V$ may be determined from the address and size of the base mipmap 312.

Processing then proceeds to step 414, wherein a determination is made whether the $LOD_U$ coordinate is 0. If a determination is made that the $LOD_U$ coordinate is 0, then processing proceeds to step 416, wherein the offset is set to 0.

If, however, in step 414, a determination is made that the $LOD_U$ coordinate is not equal to 0, then processing proceeds to steps 418, wherein a base mipmap exponent is determined as the power of 2 that is equivalent of the width of the base mipmap. For example, in the scenario described above with reference to FIG. 3, the base mipmap has a width of 8, therefore the base mipmap exponent is 3 ($2^3$=8). Next, in step 420, $U_{HIGH}$ is determined by a bit-wise shift left of "000000000001" (assuming 12-bit addressing) the number of bit positions equivalent to the base mipmap exponent.

Processing then proceeds to step 422, wherein a prior mipmap exponent is determined as the base mipmap exponent less $LOD_U$ element of the ($LOD_U$, $LOD_V$) coordinate for the desired mipmap less 1. Next, in step 424, ULOW is determined as a bit-wise shift left of "000000000001" (assuming 12-bit addressing) the number of bits equivalent to the prior mipmap exponent. Thereafter, in step 426, the offset is determined as a value equivalent to the union of $U_{LOW}$ and $U_{HIGH}$, with all bit positions between the $U_{HIGH}$ bit and the $U_{LOW}$ bit set to a "1".

After step 416 or step 426, processing proceeds to step 428, wherein the desired mipmap address is set to the sum of the base address and the offset, and the desired mipmap is then retrieved from memory, after which, processing returns to step 214 (FIG. 2).

The following Table 1 is provided as an example of the addressing described above for a base mipmap size of 8×8 and specifies the $U_{HIGH}$ value, the $U_{LOW}$ value, and the offset address for each $LOD_U$ mipmap coordinate. It should be noted that the example is provided for purposes of illustration only and should not limit the present invention in any manner. The construction of similar tables for base mipmaps of other sizes is considered to be obvious to a person of ordinary skill in the art upon a reading of the present invention.

TABLE 1

| $LOD_U$ | $U_{HIGH}$ | $U_{LOW}$ | Offset Address |
| --- | --- | --- | --- |
| 0 | 000000000000 | 000000000000 | 000000000000 |
| 1 | 000000001000 | 000000001000 | 000000001000 |
| 2 | 000000001000 | 000000000100 | 000000001100 |
| 3 | 000000001000 | 000000000010 | 000000001110 |

It is understood that the present invention can take many forms and embodiments. Accordingly, several variations may be made in the foregoing without departing from the spirit or the scope of the invention. For example, larger or smaller mipmaps may be used, a different memory scheme may be implemented, and/or the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of retrieving a desired mipmap from one or more mipmaps, the method comprising the steps of:
   determining a base address of a row of mipmaps containing the desired mipmap;
   determining an offset to the desired mipmap from the base address, wherein the determining the offset further comprises:
      determining whether the desired mipmap is the first mipmap, in the row;
      upon a determination that the desired mipmap is the first mipmap, setting an offset address to 0; and
      upon a determination that the desired mipmap is not the first mipmap, setting the offset address to a value bit-filled with ones from a first bit position to a second bit position, wherein the first bit position corresponds to the exponent of the width of a base map and the second bit position corresponds to the exponent of the width of the base map less a row position of the row less 1;
   determining an indexed address of the desired mipmap as the sum of the base address and the offset; and
   retrieving the desired mipmap at the indexed address.

2. The method of claim 1, wherein the step of determining an offset comprises calculating the sum of all intervening mipmaps between the base address and the desired mipmap.

3. A method of retrieving a section of a row of data from memory, the method comprising the steps of:
   receiving a row and column coordinate of the section;
   retrieving a start address of the row corresponding to the row coordinate;
   determining whether the column coordinate is substantially equivalent to 0; upon a determination that the column coordinate is substantially equivalent to 0, setting an offset address to 0;
   upon a determination that the column coordinate is not substantially equivalent to 0, setting the offset address to a value bit-filled with ones from a first bit position to a second bit position, wherein the first bit position corresponds to the exponent of the width of a base map and the second bit position corresponds to the exponent of the width of the base map less the row coordinate less 1; and
   retrieving the section of memory located at the sum of the start address and the offset address.

4. An apparatus for retrieving a desired mipmap from one or more mipmaps, the apparatus comprising:
   means for determining a base address of a row of mipmaps containing the desired mipmap;
   means for determining an offset to the desired mipmap from the base address, wherein the means for determining the offset further comprises:
      means for determining whether the desired mipmap is the first mipmap in the row;
      means, upon a determination that the desired mipmap is the first mipmap, for setting an offset address to 0; and
      means, upon a determination that the desired mipmap is not the first mipmap, for setting the offset address to a value bit-filled with ones from a first bit position to a second bit position, wherein the first bit position corresponds to the exponent of the width of a base map and the second bit position corresponds to the exponent of the width of the base map less a row position of the row less 1;
   means for determining an indexed address of the desired mipmap as the sum of the base address and the offset; and
   means for retrieving the desired mipmap at the indexed address.

5. The apparatus of claim 4, wherein the means for determining an offset comprises means for calculating the sum of all intervening mipmaps between the base address and the desired mipmap.

6. An apparatus for retrieving a section of a row of data from memory, the apparatus comprising:
   means for receiving a row and column coordinate of the section;
   means for retrieving a start address of the row corresponding to the row coordinate;
   means for determining whether the column coordinate is substantially equivalent to 0;
   means, upon a determination that the column coordinate is substantially equivalent to 0, for setting an offset address to 0;
   means, upon a determination that the column coordinate is not substantially equivalent to 0, for setting the offset address to a value bit-filled with ones from a first bit position to a second bit position, wherein the first bit position corresponds to the exponent of the width of a base map and the second bit position corresponds to the exponent of the width of the base map less the row coordinate less 1; and
   means for retrieving the section of memory located at the sum of the start address and the offset address.

7. A computer program product for retrieving a desired mipmap from one or more mipmaps, the computer program product having a medium with a computer program embodied thereon, the computer program comprising:
   computer program code for determining a base address of a row of mipmaps containing the desired mipmap;
   computer program code for determining an offset to the desired mipmap from the base address, wherein the computer program for determining the offset further comprises:
      computer program for determining whether the desired mipmap is the first minmap in the row;
      computer program code for, upon a determination that the desired mipmap is the first mipmap, setting an offset address to 0; and
      computer program code for, upon a determination that the desired mipmap is not the first mipmap, setting the offset address to a value bit-filled with ones from a first bit position to a second bit position, wherein the first bit position corresponds to the exponent of the width of a base map and the second bit position corresponds to the exponent of the width of the base map less a row position of the row less 1;
   computer program code for determining an indexed address of the desired mipmap as the sum of the base address and the offset; and
   computer program code for retrieving the desired mipmap at the indexed address.

8. The computer program product of claim 7, wherein the computer program code for determining an offset comprises computer program code for calculating the sum of all intervening mipmaps between the base address and the desired mipmap.

9. A computer program product for retrieving a section of a row of data from memory, the computer program product having a medium with a computer program embodied thereon, the computer program comprising:

computer program code for receiving a row and column coordinate of the section;

computer program code for retrieving a start address of the row corresponding to the row coordinate;

computer program code for determining whether the column coordinate is substantially equivalent to 0;

computer program code for, upon a determination that the column coordinate is substantially equivalent to 0, setting an offset address to 0;

computer program code for, upon a determination that the column coordinate is not substantially equivalent to 0, setting the offset address to a value bit-filled with ones from a first bit position to a second bit position, wherein the first bit position corresponds to the exponent of the width of a base map and the second bit position corresponds to the exponent of the width of the base map less the row coordinate less 1; and computer program code for retrieving the section of memory located at the sum of the start address and the offset address.

* * * * *

UNITED STATES PATENT AND TRADEMARK OFFICE
CERTIFICATE OF CORRECTION

PATENT NO.     : 6,738,070 B2
DATED          : May 18, 2004
INVENTOR(S)    : Daniel Alan Brokenshire et al.

It is certified that error appears in the above-identified patent and that said Letters Patent is hereby corrected as shown below:

<u>Column 6,</u>
Line 50, delete "minmap" and insert -- mipmap --

Signed and Sealed this

Twentieth Day of July, 2004

JON W. DUDAS
*Acting Director of the United States Patent and Trademark Office*